(12) United States Patent
Zickermann et al.

(10) Patent No.: US 7,741,740 B2
(45) Date of Patent: Jun. 22, 2010

(54) GAS-COOLED ELECTRICAL DEVICE

(75) Inventors: Richard Michael Zickermann, Villnachern (CH); Alexander Schwery, Kuettigen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 12/173,686

(22) Filed: Jul. 15, 2008

(65) Prior Publication Data

US 2008/0309177 A1    Dec. 18, 2008

Related U.S. Application Data

(63) Continuation of application No. PCT/EP2007/050375, filed on Jan. 16, 2007.

(30) Foreign Application Priority Data

Jan. 16, 2006    (DE)    ............ 10 2006 002 173

(51) Int. Cl.
*H02K 9/00*    (2006.01)
(52) U.S. Cl. .................. 310/59; 310/52; 310/270
(58) Field of Classification Search ............ 310/52–59, 310/254, 260, 261, 270
See application file for complete search history.

(56) References Cited

U.S. PATENT DOCUMENTS

| 3,739,208 | A | * | 6/1973 | Shartrand | ............ | 310/58 |
| 3,755,702 | A | * | 8/1973 | Willyoung | ............ | 310/53 |
| 3,809,934 | A | * | 5/1974 | Baer et al. | ............ | 310/53 |
| 3,969,643 | A | * | 7/1976 | Sapper | ............ | 310/53 |
| 4,071,790 | A | * | 1/1978 | Darby et al. | ............ | 310/59 |
| 4,100,439 | A | * | 7/1978 | Boer et al. | ............ | 310/57 |
| 4,246,503 | A | * | 1/1981 | Fujioka et al. | ............ | 310/59 |
| 4,547,688 | A | * | 10/1985 | Hammer et al. | ............ | 310/59 |
| 4,609,840 | A | * | 9/1986 | Eats et al. | ............ | 310/58 |
| 5,276,374 | A | * | 1/1994 | Geller et al. | ............ | 310/59 |
| 2003/0034701 | A1 | * | 2/2003 | Weeber et al. | ............ | 310/52 |
| 2003/0080636 | A1 | * | 5/2003 | Boardman et al. | ............ | 310/58 |
| 2004/0066099 | A1 | * | 4/2004 | Weeber et al. | ............ | 310/58 |

FOREIGN PATENT DOCUMENTS

| DE | 19732949 A1 | 2/1999 |
| EP | 0013658 A1 | 7/1980 |
| EP | 0118802 A1 | 9/1984 |
| EP | 0643465 A1 | 3/1995 |
| EP | 0840426 A | 5/1998 |
| EP | 1389826 A2 | 2/2004 |

* cited by examiner

*Primary Examiner*—Thanh Lam
(74) *Attorney, Agent, or Firm*—Volpe and Koenig, P.C.

(57) ABSTRACT

The invention relates to a gas-cooled electrical device (13), especially a gas-cooled generator, which comprises at least a rotor (1), a stator (2) and also a stator casing (3) which encloses this stator, and an end-winding space (5). In this case, passages for a cooling gas are provided both in the rotor (1) and in the stator (2), wherein the end-winding space (5), especially connectors (7) and/or output conductors (7) which are arranged therein, are impinged by at least some of the cooling gas flow (8) which issues from the rotor (1). In order to be able to achieve an especially concentrated and controlled cooling, at least the connectors (7) and the output conductors (7) are arranged in the working area of at least one guiding device (14) which guides the cooling gas flow (8).

8 Claims, 2 Drawing Sheets

Stand der Technik / prior art

GAS-COOLED ELECTRICAL DEVICE

CROSS REFERENCE TO RELATED APPLICATIONS

This application is a continuation of International Application No. PCT/EP2007/050375 filed Jan. 16, 2007, which claims priority to DE Patent Application No. 10 2006 002 173.8, filed Jan. 16, 2006, the contents of which are incorporated by reference as if fully set forth.

FIELD OF INVENTION

The invention relates to a gas-cooled electrical device, especially a gas-cooled generator. The invention also relates to a method for cooling such an electrical device.

BACKGROUND

Electrical devices which are formed as generators as a rule comprise a rotor, a stator, and also a casing which encloses the stator. Stator winding bars, which are constructed from strands which are insulated against each other and arranged one above the other in slots, in this case are arranged in a stator body, especially in a laminated stator core, on the end faces of which they project into an end-winding space. There, they are bent in the radial direction and in the circumferential direction, and at their ends are electrically and mechanically connected to a winding. The end-winding space in this case accommodates the stator end windings and also the connectors and output conductors. In the case of electrical devices with indirectly cooled stator winding, a gaseous cooling medium, as a rule cooling air, is introduced into the rotor in the region of the rotor hub. By slots in the rotor rim it discharges in an air gap in order to impinge upon essentially radially extending passages of the stator for the purpose of cooling the stator winding. A partial flow of the cooling gas flow is axially deflected in the direction of the end-winding space and used for cooling the components which are located there, especially the connectors and the output conductors. Alternatively, this partial flow can also be provided by a ventilation device which is installed on the rotor on the end face, especially by a fan or by an external fan which is arranged in the region of the end windings. Especially in the case of modern high-power units, reliable cooling of the connectors and output conductors represents an increasing challenge in this case. While the part of the winding which is embedded in the winding slots is cooled in a concentrated manner, the exposed winding parts in the end-winding space, especially the connectors and output conductors, are exposed to the risk of excessive heating. On account of their position, like in the lee of the end windings, a defined cooling of the connectors and output conductors is simply difficult to realize. The flow velocity of the cooling gas flow in this region, moreover, is low and the cooling gas flow is unevenly distributed so that the flow parameters are altogether simply difficult to control.

Pressure losses and flow deflections during exposure of the end windings to throughflow, furthermore, bring about an uneven impingement upon the downstream components which are to be cooled, and the comparatively low flow velocity with the inevitable consequence of the risk of an at least locally unsatisfactory cooling of these components. A theoretically possible increasing of the volumetric flow of the cooling gas flow in this region does not provide a significant alleviation of this problem.

In the case of electrical devices with directly cooled stator winding, however, the described problems do not occur since the cooling gas which flows through the hollow conductor brings about an adequate cooling of the conductor bars. Measures for such a direct cooling of the conductor bars, however, are associated with significant cost.

SUMMARY

The present invention relates to a gas-cooled electrical device, particularly a gas-cooled generator. The generator includes at least one rotor, at least one stator having a stator casing which encloses the stator and an end-winding space. The rotor and the stator include passages for a cooling gas. The end-winding space, in which end windings, connectors and/or output conductors are arranged, are impinged by at least some of the cooling gas flow, that emerges from the rotor or that is produced by a ventilation device. At least the connectors and the output conductors are arranged in a working area of at least one guiding element which guides the cooling gas flow.

The invention also relates to a method for cooling a gas-cooled generator having at least one rotor, at least one stator with a stator casing which encloses the stator; and an end-winding space. The rotor and the stator include passages for a cooling gas; the end-winding space, in which end windings, connectors and/or output conductors are arranged, are impinged by at least some of the cooling gas flow, that emerges from the rotor or that is produced by a ventilation device. At least the connectors and the output conductors are arranged in a working area of at least one guiding element which guides the cooling gas flow. The method includes directing at least some of a cooling gas flow in a region of the end-winding space between radially inner and radially outer one of the guiding elements. The method also includes accelerating and concentrating the cooling gas flow to form a concentrated cooling gas. The method further includes impinging the end windings, the connectors and/or the output conductors arranged in the end-winding space (5), with the concentrated cooling gas flow (8) of increased velocity.

BRIEF DESCRIPTION OF THE DRAWINGS

Further important features and advantages of the machine according to the invention result from the dependent claims, from the drawings and from the associated figure description, with reference to the drawings.

Preferred exemplary embodiments of the invention are represented in the drawings and are explained in more detail in the following description, wherein like designations refer to the same, or similar, or functionally the same components.

Figure 1:
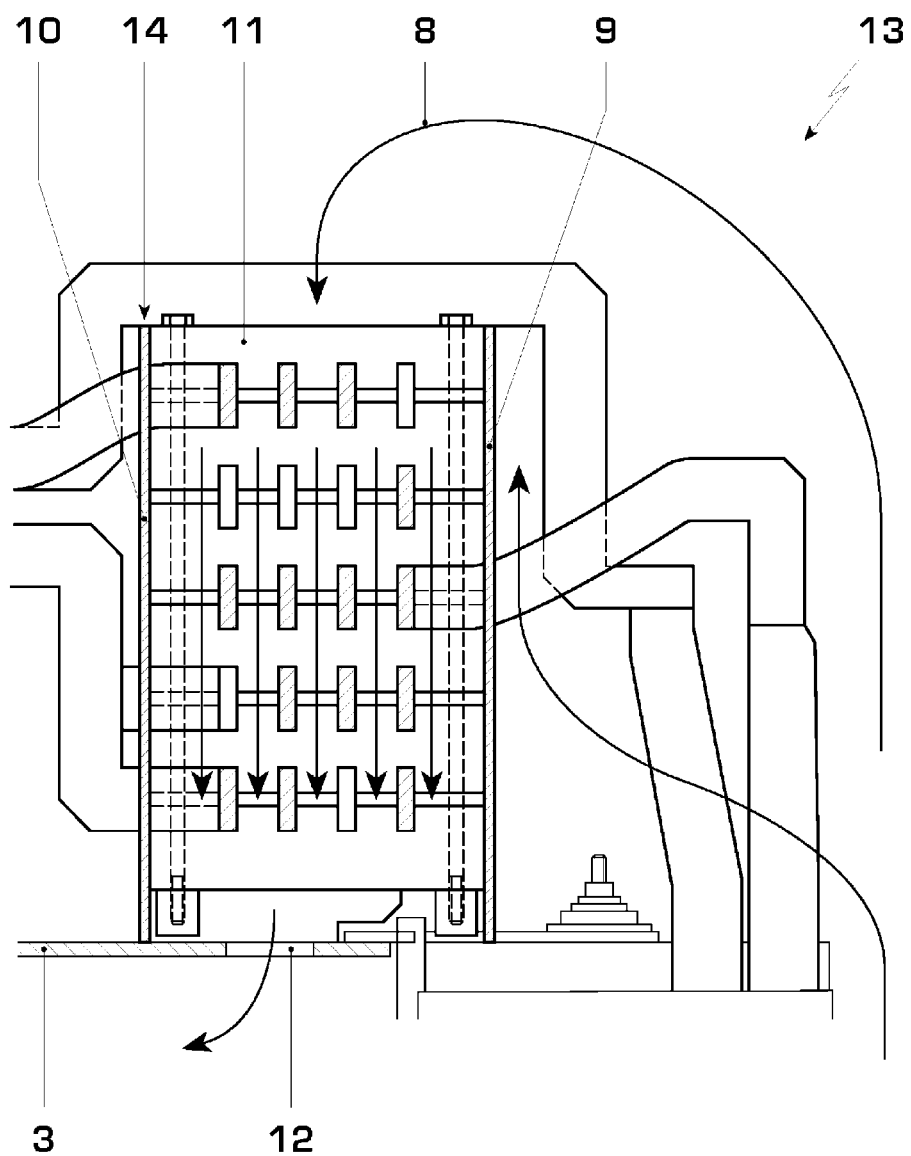
Figure 2:
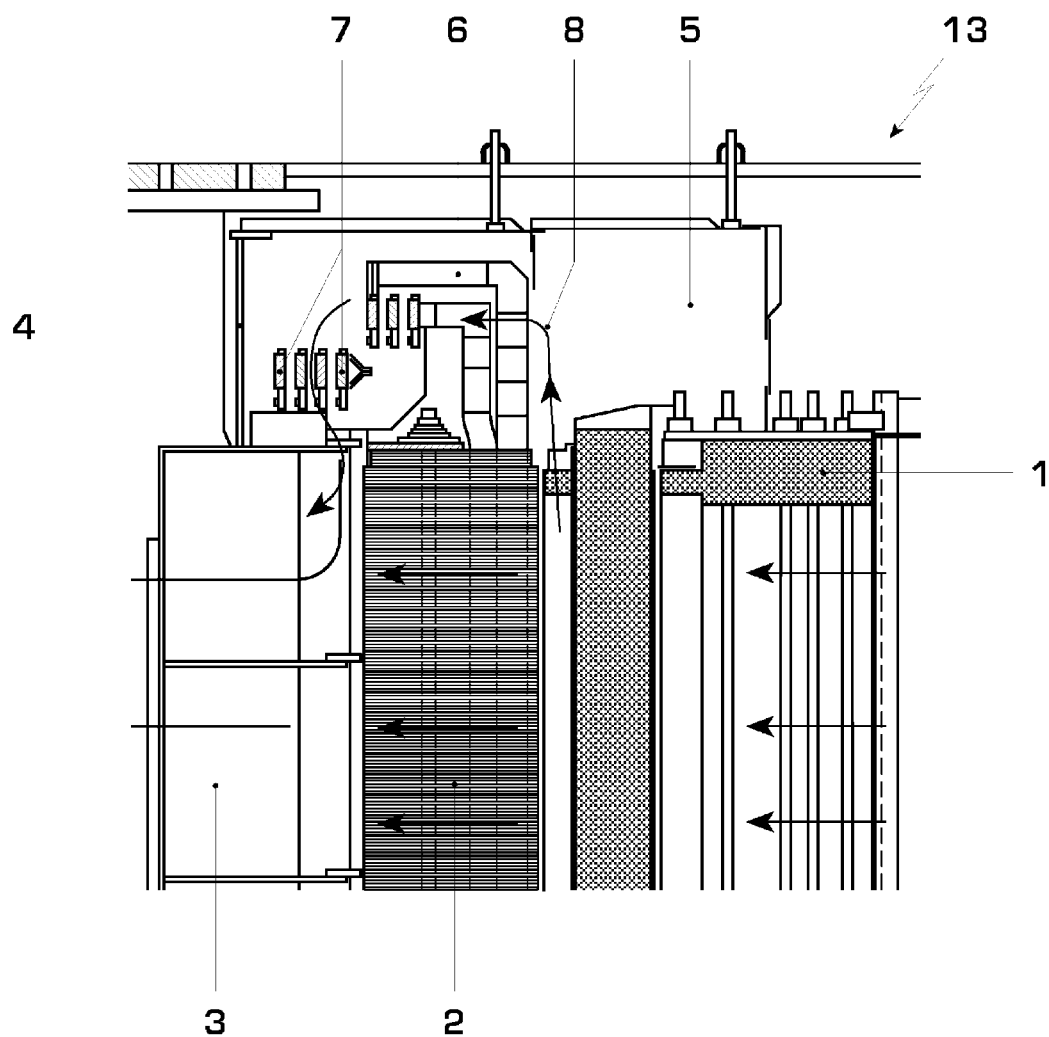

In this case, in the drawing, schematically in each case,

FIG. 1 shows a detailed view of the electrical device in the region of an end winding with a concept according to the invention of an improved cooling gas guiding FIG. 2 shows a sectional view through an electrical device according to the prior art, in which a concept according to the invention according to FIG. 1 can be applied.

DETAILED DESCRIPTION OF THE PREFERRED EMBODIMENTS

Introduction to the Embodiments

The invention deals with the problem of providing a cooling gas guiding concept of a gas-cooled electrical device, especially of an air-cooled generator, which ensures a reliable cooling of the components of an end-winding space, especially of the connectors and output conductors, and which at the same time can be constructed and/or retrofitted at little cost. This problem is addressed in further detail below.

The invention is based on the general idea of arranging flow-directing guiding devices in a gas-cooled electrical device in the region of its end windings with the aim of establishing defined flow conditions in order to be able to feed cooling gas in a concentrated manner to the components which are exposed to the risk of increased heating. As a result of this, a previously uncontrolled cooling gas flow is now to be fed in a channeled and purpose-oriented manner to the components which are arranged in the end-winding space, and consequently a reliable cooling of the components, associated with increased service life of the components, is to be achieved.

The guiding device expediently has at least one guiding element which is located radially outside the connectors and the output conductors, and at least one guiding element which is located radially inside the connectors and the output conductors. The two guiding elements, which are arranged at a distance from each other, in this case form a cooling gas passage which allows the components which are to be cooled to be exposed to defined flow conditions and especially to create an increased velocity of the cooling gas flow, as a result of which a reliable cooling of the just mentioned components can be ensured.

In an advantageous development of the solution according to the invention, the guiding elements, at their ends which face away from the stator casing, form an inlet for the cooling gas flow. The establishing of clear flow conditions in the flow passage which is formed, which is formed by the two guiding elements, calls for a corresponding arrangement of inlet or outlet openings for the cooling gas. As a result of the defined inlet, which is formed by the guiding elements, a defined inlet cross section is formed at the same time, and consequently an accurately established cooling gas flow or a defined and reliable cooling of the components which are arranged in the end-winding space is achieved.

In general, the advantages of the invention are that the cooling gas flow is now guided in a concentrated manner and consequently in the region of the connectors and output conductors clear flow conditions and increased flow velocities are created.

DETAILED DESCRIPTION

Corresponding to FIG. 2, an electrical device 13, especially a generator, has a rotor 1 and also a stator 2 which encloses this, wherein the stator 2 comprises a stator body, especially a laminated stator core, which is constructed from body sections, especially laminated core sections, which are at a distance from each other, the stator body, similar to a rotor rim, is constructed from segmented sections, especially laminates, and has radially extending cooling slots between adjacent laminated core sections. The laminated stator core is enclosed by a stator supporting structure which on one side is supported on a foundation, which is not shown, and on the other side is connected to a bearing bracket which absorbs the vertical and horizontal forces from the bearings and directs them into the supporting structure.

Furthermore, the machine 13 has an end-winding space 5 with an end-winding cover 4, wherein components 7, especially connectors 7 and output conductors 7, are arranged in the end winding space 5. For cooling these components 7 in the end-winding space 5, a cooling gas flow 8, especially a partial flow 8 of cooling gas flowing from the rotor 1, is deflected in the axial direction and directed in the direction of the end faces of the stator 2 towards the end windings 6. There, the (partial) cooling gas flow 8 experiences in turn a deflection in the radial direction and first flows through the end windings 6 in order to subsequently flow-wash the connectors 7 and output conductors 7 which are arranged radially further out. Continuing in its course, the cooling gas is discharged or extracted via openings 12 in the stator casing 3, and, depending upon the type of cooling, is diverted to the electrical device 13 or fed to a cooler. In order to avoid pressure losses and flow deflections during exposure of the end windings 6 to throughflow, which cause an uneven impingement of the downstream components 7 which are to be cooled and a comparatively low flow velocity with the inevitable consequence of the risk of an at least locally unsatisfactory cooling of these components 7, at least the connectors 7 and the output conductors 7 are arranged in the working area of at least one guiding device 14 which guides the cooling gas flow 8 and has at least one guiding element 10 which is located radially outside the components 7 and also at least one guiding element 9 which is located radially inside the components 7. The two guiding elements 9, 10 in this case are preferably formed in the form of two walls which are at a distance from each other and extend in an annular manner in the circumferential direction, and together form a channel-like duct for the (partial) cooling gas flow 8.

At their end which faces the stator casing 3, the guiding elements 9, 10 are mechanically connected to the casing. The radially inner guiding element 9 and the radially outer guiding element 10 in this case are arranged on the stator casing 3, preferably essentially perpendicularly to this and parallel to each other, in such a way that they completely enclose the components 7, especially the connectors 7 and the output conductors 7. Since the connectors 7 are arranged in a multiplicity of different planes, in this case horizontal planes, there being five planes lying one above the other in the selected exemplary embodiment, the guiding elements 9, 10 have a correspondingly adapted axial extent in order to completely enclose the connectors 7 and the output conductors 7. In general, the guiding elements 9, 10 in this case can have a different axial extent, in particular the radially inner guiding element 9 can have a smaller axial extent than the radially outer guiding element 10.

At their ends which face away from the stator casing 3, the two guiding elements 9, 10 form an inlet 11 for the cooling gas flow 8. The passage which is formed around the components 7 in this case is open at the top according to FIG. 1.

Such a design prevents an uncontrolled or uneven impingement of the connectors 7 and output conductors 7 with the gaseous cooling medium. After flowing through the end windings 6 in the radial direction, the cooling gas flow 8 is first of all prevented from impinging upon the components 7 in a direct and uncontrolled manner. In this case, the inner guiding element 9 brings about an axial deflection of the cooling gas flow 8 along its surface to its free end which faces away from the stator 2. As a consequence of the prevailing pressure ratios, a flow deflection into the passage which is formed by the guiding elements 9, 10 takes place there. As a result of the limited available flow cross section 11 between the guiding elements 9, 10, a concentration and an acceleration of the cooling gas flow takes place, which results in the components 7 being impinged with cooling gas in an intensive and controlled manner. Cooling gas flows of low velocity with an uncontrolled impingement upon the connectors 7 and output conductors 7 which lie in the lee of the end windings 6, are therefore excluded.

The design with free-ending guiding elements 9, 10 in this case can be very simply and inexpensively constructed and/or retrofitted. It is not, however, compulsory. Alternatively, by suitable constructional measures in the inlet 11 between the guiding elements 9, 10, it is also opportune to boost an optimum impingement of the components 7 which are to be cooled with the (partial) cooling gas flow 8. Thus, it is conceivable for example to form the guiding elements 9, 10, as mentioned above, with different lengths, i.e. with a different axial extent, wherein for example the radially inner guiding element 9 is formed shorter. It is also conceivable that in this region of the guiding elements 9, 10 flow guiding devices, such as flow guide vanes, are arranged in order to influence in a desired manner the direction of the inflowing cooling gas flow 8 or its mass flow distribution over the flow cross section 11. This can especially bring about an evening, or, if applicable, also a purposeful unevening of the inflowing cooling gas, wherein an optimum impingement of the components 7 which are to be cooled is to be continually achieved.

In general, the radially outer guiding element 10, at least in sections, can form an outer wall of the end-winding cover 4. As FIG. 1 further shows, the ends of the two guiding elements 9, 10 which face the stator casing 3 are connected to the stator casing 3 in a fixed manner, wherein the cooling gas flow 8 can be extracted through openings 12 in the stator casing 3.

By the device 13 according to the invention, therefore, an accurately defined cooling gas flow can be created and consequently a requirement-dependent cooling of the components 7, especially of the connectors 7 and/or of the output conductors 7, can be achieved, as a result of which especially the service life of the machine 13 can be increased.

LIST OF DESIGNATIONS

1 Rotor
2 Stator
3 Stator casing
4 End-winding cover
5 End-winding space
6 End winding
7 Components, connectors, output conductors
8 Partial flow/cooling gas flow
9 Radially inner guiding element
10 Radially outer guiding element
11 Inlet/inflow cross section
12 Extraction opening for the cooling gas in the stator casing 3
13 Electrical device
14 Guiding device

What is claimed is:

1. A gas-cooled electrical device (13), particularly a gas-cooled generator, comprising at least one rotor (1), at least one stator (2) having a stator casing (3) which encloses the stator (2); and an end-winding space (5), the at least one rotor (1) and the at least one stator (2) include passages for a cooling gas; the end-winding space (5), in which at least one of end windings (6), connectors (7) or output conductors are arranged, are impinged by at least some of the cooling gas flow (8), that emerges from the rotor (1) or that is produced by a ventilation device, at least the connectors and the output conductors are arranged in a working area of at least one guiding device (14) which guides the cooling gas flow, the guiding device (14) has at least one guiding element (10, 9) which is located radially outside the connectors (7) and the output conductors (7), and at least one guiding element (10, 9) which is located radially inside the connectors (7) and the output conductors (7).

2. The gas-cooled electrical device as claimed in claim 1, wherein two guiding elements (9, 10) are formed in the form of two walls which are at a distance from each other and extend in annular fashion in the circumferential direction.

3. The gas-cooled electrical device as claimed in claim 2, wherein the guiding elements (9, 10) are mechanically connected to the stator casing (3).

4. The gas-cooled electrical device as claimed in claim 2, wherein the guiding elements (9, 10), at ends that face away from the stator casing (3), form an inlet (11) for the cooling gas flow (8).

5. The gas-cooled electrical device as claimed in claim 2, wherein the guiding elements (9, 10) have different axial extents.

6. The gas-cooled electrical device as claimed in claim 5, wherein a radially inner guiding element (9) has a smaller axial extent than a radially outer guiding element (10).

7. The gas-cooled electrical device as claimed in claim 1, wherein at least one guiding element (9, 10), at an end which faces away from the stator casing (3), has a flow guiding device.

8. The gas-cooled electrical device as claimed in claim 6, wherein the radially outer guiding element (10) at least in sections forms an outer wall of an end-winding cover (4).

* * * * *